Patented Apr. 6, 1926.

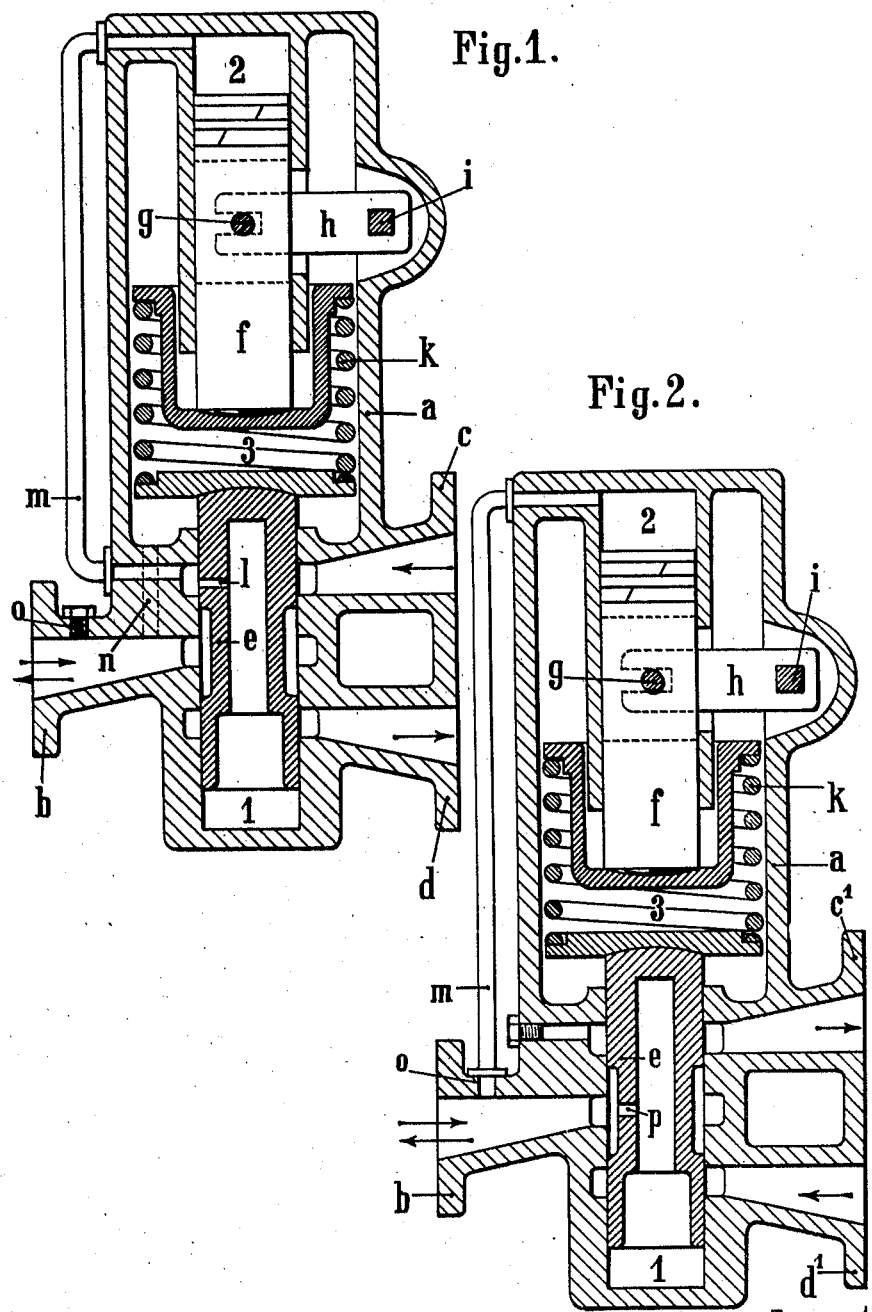

1,579,940

UNITED STATES PATENT OFFICE.

JACOB IVERSEN, OF BERLIN, GERMANY.

APPARATUS FOR AUTOMATICALLY REGULATING FLUID PRESSURES.

Application filed April 11, 1924. Serial No. 705,740.

*To all whom it may concern:*

Be it known that I, JACOB IVERSEN, a subject of the King of Sweden, and residing at Berlin, State of Prussia, German Empire, have invented certain new and useful Improvements in Apparatus for Automatically Regulating Fluid Pressures, of which the following is a specification.

My invention relates to improvements in apparatus for automatically regulating fluid pressures and more particularly in apparatus of the type comprising a valve controlling the supply or discharge of the pressure fluid of a container (such as, for example, a brake cylinder) and operatively connected with a pressure member such as a piston acted upon by the fluid within said container and adapted to be set in different positions for regulating the pressure within the container. Apparatus of this type are used in combination with fluid operated brakes, hydraulic or pneumatic presses, fluid operated clutches, and the like. The object of the improvements is to provide an apparatus in which the mass and the frictional resistance of the movable members are reduced to a minimum, in which there is no reaction on the operating member, and which is adapted for use in connection with brakes of the admission and outlet types. With this object in view my invention consists in causing the fluid pressure to act in opposite directions on the piston and the slide, and so that the forces acting on the said parts balance each other.

For the purpose of explaining the invention two examples embodying the same have been shown in the accompanying drawing, in which—

Fig. 1 is a sectional elevation of the apparatus designed for use in combination with the brake cylinder of a brake, in which the steam pressure acts on opposite sides of the brake piston and is regulated by the discharge of steam from one end of the brake cylinder, and Fig. 2 is a similar elevation showing the apparatus as used in combination with a brake cylinder in which the steam acts on one side of the brake piston.

In describing the invention reference will be made to the use of the apparatus in combination with a brake cylinder. But I wish it to be understood that I do not limit myself to such use.

In the example shown in Fig. 1 my improved apparatus comprises a casing $a$ having extensions or flanges $c$ and $d$ provided, respectively, with an inlet and an outlet for the pressure fluid such as steam and a further extension or flange $b$ provided with a passage connected with the brake cylinder. The casing shows two cylindrical chambers 1 and 2 of even diameters, and a chamber 3 intermediate the chambers 1 and 2, the chamber 1 having a cylindrical slide valve $e$ movable therein, and the chamber 2 enclosing a piston $f$. Between the plunger and the slide valve there is a coiled spring $k$ adapted to transmit pressure from the piston to the valve, and the piston is provided with a lug or bolt $g$ engaged by an arm $h$ secured to a shaft $i$ adapted to be rocked for setting the piston in different positions. The arm $h$ is disposed within the casing $a$ and the shaft $i$ is guided for rocking in suitable bushings disposed in the wall of the casing, so that the resistance of the mechanism by friction is reduced to a minimum. The inlet passage at $c$ communicates through a transverse bore $l$ and an axial bore of the valve $e$ with the chamber 1 provided below the valve, and through a pipe $m$ with the chamber 2 provided above the piston $f$. Therefore there is the same fluid pressure within the said chambers and the same pressure is exerted in opposite directions on the outer end faces of the piston $f$ and the valve $e$. The pressure within the passage at $b$ connected with the brake cylinder is transmitted through a bore $n$ to the chamber 3 provided between the piston and the slide valve, so that the inner end faces of the piston and the slide valve are acted upon in different directions by the fluid pressure within the brake cylinder.

The operation of the apparatus is as follows:

In the position of the parts shown in Fig. 1, the slide valve $e$ closes the brake cylinder against the admission and discharge passage at $c$ and $d$ and the piston $f$ and the parts $h$ and $i$ are in median position corresponding to one half of the highest regulated pressure within the brake cylinder. If the braking pressure is to be increased, the piston $f$ is moved downwards by turning the shaft $i$. This movement is transmitted through the spring $k$ to the slide valve $e$, which opens the discharge passage $d$, thereby effecting a decrease of pressure in the brake cylinder at the rear of the brake piston as well as in the chamber 3 through the bore $n$. This reduction of pressure effects an increase of the difference of pressure on both sides of the piston of the brake cylinder, i. e. it effects an increase of the braking power and at the same time shifts the slide valve $e$ upwards, until it is held in median position through the increasing power of the spring.

If the braking power is to be diminished and the changeable pressure be increased, the movements take place in a reverse manner.

As appears from the figure, in any position of the rock shaft $i$ the slide valve $e$ and the piston $f$ are held in equilibrium by the pressure of the live steam acting on the outer faces of the valve and piston and by the sum of the pressures of the steam and the spring $k$ acting on the inner faces of the said parts. Therefore, the movable parts do not exert any pressure on the rock shaft $i$.

In Fig. 2, I have shown the apparatus as used in combination with a brake cylinder in which the fluid pressure acts on one side of the brake piston. The general construction of the apparatus is the same as that of the apparatus shown in Fig. 1 and the same letters of reference have been used to indicate corresponding parts. The inlet and outlet passages are reversed, the passage at $d^1$ being connected to the steam supply and the passage at $c^1$ to the discharge, the bores $l$ and $n$ are omitted, and the pipe $m$ is connected to the passage at $b$ through a bore $o$. The valve $e$ is provided with a bore $p$ connecting the passage at $b$ and the brake cylinder with the chamber 1. Therefore, the outer end faces of the piston $f$ and the slide valve $e$ are always acted upon by the pressure within the brake cylinder, and the inner end faces are under atmospheric pressure.

Also in this case the parts are shown in median position corresponding to one half of the highest regulated pressure within the brake cylinder. An increase of this median pressure is attained by the downward movement of the piston $f$. Hereby the spring $k$ also moves the slide valve $e$ downwards until the under passage $d^1$ is opened for the live steam which then enters the cylinder and effects an increase of pressure. This increase of pressure is transmitted through the bore $p$ to the lower end face of the slide valve $e$ and immediately effects a return motion of the slide valve into its median position, where it is held in consequence of the greater spring power. If the braking power within the cylinder is to be diminished, the piston $f$ is to be moved upwards. The movement of the slide valve then takes place alone, only in a reverse manner as by the increase of pressure.

Also in this case the forces acting on the parts are in equilibrium, and no pressure is exerted on the rock shaft $i$. Besides, in both cases the end surfaces of the piston of the brake cylinder as well as of the supplementary piston or slide valve are subjected to the same pressures or difference of pressures. Therefore, the spring power, which compensates the difference of pressures, must correspond exactly with the momentary power of the piston of the brake cylinder. On the other side the spring has always the same power, at a certain position of the lever $h$ or the shaft $i$. Thereby one attains through the invention is question, that, independently of the construction of the brake cylinder, always the same braking power prevails in the cylinder at a certain position of the brake lever or of the shaft $i$ operated by the lever.

Important features of my improved apparatus are the following: The cost of the manufacture of the apparatus is low because there is no stem traversing the slide valve and requiring stuffing boxes, the length of the apparatus is reduced as compared to apparatus now in use, the apparatus is not affected by minor inaccuracies in assembling the parts, the apparatus is exact and quick in operation, because the weight and the friction of the movable parts are reduced to a minimum. The apparatus can be operated from any direction so that intermediate gears may be dispensed with and the operating mechanism is simple in construction. Furthermore the apparatus can always be mounted in the same position, so that in case of steam operated systems the water of condensation can be removed in a simple and reliable way.

It will be understood that the same apparatus can be provided for both types of brakes referred to above, the ports $n$, $o$, $l$ and $p$ and the bore to which the pipe $m$ is connected in Fig. 1 being closed where they are not needed.

Of course, instead of steam air, gas or liquids under pressure may be used.

What I claim is:—

1. An apparatus of the class described, comprising a casing having an inlet and an outlet for a pressure fluid, a passage adapted for communication with a container, and two chambers, a slide valve movable in one of said chambers and controlling said inlet, outlet and passage, a pressure member within the other chamber, said slide valve and pressure member having equal areas, means for transmitting pressure from said pressure member to said valve, means for operating said pressure member, and passages for supplying pressure fluid of equal pressure from opposite sides to said slide valve and pressure member.

2. An apparatus of the class described comprising a casing having an inlet and an outlet for a pressure fluid, a passage adapted for communication with a container, two cylindrical chambers of equal areas, and a chamber between said cylindrical chambers, a slide valve movable in one of said cylindrical chambers and controlling said inlet, outlet and passage, a piston within the other one of the cylindrical chambers, a spring intermediate said piston and slide valve, means for shifting said piston, and passages for supplying pressure fluid of equal pressure to said cylindrical chambers at opposite sides of said piston and slide valve.

3. An apparatus of the class described comprising a casing having an inlet and an outlet for a pressure fluid, a passage adapted for communication with a container, two cylindrical chambers of equal areas, and a chamber intermediate said cylindrical chambers, a slide valve movable in one of said cylindrical chambers and controlling said inlet, outlet and passage, a piston within the other one of the cylindrical chambers, a spring intermediate said piston and slide valve, means for shifting said piston, channels connecting said inlet with said cylindrical chambers at the outer sides of the piston and slide valve, and a channel connecting said intermediate chamber with said passage.

4. An apparatus of the class described, comprising a casing having an inlet and an outlet for a pressure fluid, a passage adapted for communication with a container, and two chambers, a slide valve movable in one of said chambers and controlling said inlet, outlet and passage, a pressure member within the other chamber, means for transmitting pressure from said pressure member to said valve, and a rock shaft passing into said casing and connected with said member for operating the same.

5. An apparatus of the class described, comprising a casing having an inlet and an outlet for a pressure fluid, a passage adapted for communication with a container, and two chambers, a slide valve movable in one of said chambers and controlling said inlet, outlet and passage, a pressure member within the other chamber, said slide valve and pressure member having equal areas, means for transmitting pressure from said pressure member to said valve, a rock shaft passing into said casing and connected with said member for operating the same, and passages for supplying pressure fluid of equal pressure from opposite sides to said slide valve and pressure member.

6. An apparatus of the class described comprising a casing having an inlet and an outlet for a pressure fluid, a passage adapted for communication with a container, two cylindrical chambers of equal areas, and a chamber between said cylindrical chambers, a slide valve movable in one of said cylindrical chambers and controlling said inlet, outlet and passage, a piston within the other one of the cylindrical chambers, a spring intermediate said piston and slide valve, a rock shaft passing into said chamber and connected with said piston for operating the same, and passages for supplying pressure fluid of equal pressure to said cylindrical chambers at opposite sides of said piston and slide valve.

In testimony whereof I have affixed my signature.

JACOB IVERSEN.